(No Model.)

J. T. TRENCH.
PNEUMATIC TIRE.

No. 596,009. Patented Dec. 21, 1897.

WITNESSES:
A. Millward Hack.
William H. James.

INVENTOR.
John Townsend Trench.
By Robert S. Phillips.
Attorney.

THE NORRIS PETERS CO., PHOTO-LITHO., WASHINGTON, D. C.

UNITED STATES PATENT OFFICE.

JOHN TOWNSEND TRENCH, OF KENMARE, IRELAND, ASSIGNOR TO THE TRENCH TUBELESS TYRE COMPANY, LIMITED, OF LONDON, ENGLAND.

PNEUMATIC TIRE.

SPECIFICATION forming part of Letters Patent No. 596,009, dated December 21, 1897.

Application filed April 26, 1897. Serial No. 634,012. (No model.) Patented in England April 17, 1896, No. 8,135.

*To all whom it may concern:*

Be it known that I, JOHN TOWNSEND TRENCH, a subject of the Queen of Great Britain, residing at Kenmare, in the county of Kerry, Ireland, have invented a new and useful Improvement in Pneumatic Tires, (for which I have obtained Letters Patent in Great Britain, No. 8,135, bearing date April 17, 1896,) of which the following is a specification.

This invention relates to that type of tire divided circumferentially on its base or under side adapted to fit in the wheel-rim; and it consists of a device for connecting the divided edges together to prevent them spreading or coming apart on the inflation of the tire.

According to my invention I connect the divided edges of the tire or tire-cover and hold them together by a series of binders made of metal or other suitable material, one end of each of the said binders being preferably attached to one edge of the tire or tire-cover and the other end shaped to adapt it to engage with circumferential lugs or other enlargements on the other edge of the tire or tire-cover, although both ends of the binders may be adapted to engage with lugs or other enlargements on the edges of the tire or tire-cover.

Figure 1:
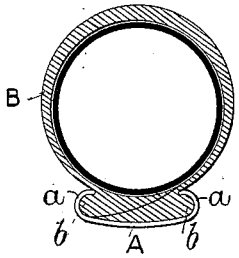
Figure 2:
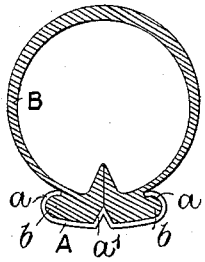
Figure 3:
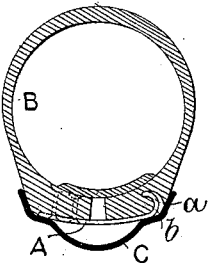
Figure 4:
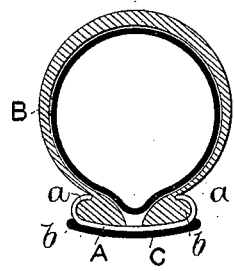
Figure 5:
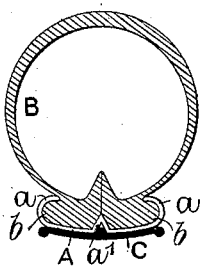
Figure 6:
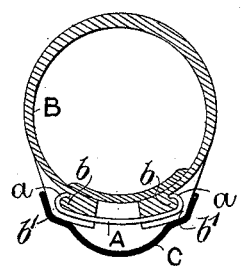
Figure 7:
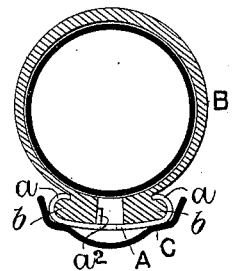
Figure 9:
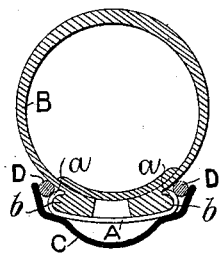
Figure 8:
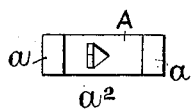
Figure 10:
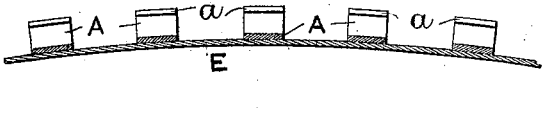

In the accompanying drawings, which illustrate by way of example some methods of carrying this invention into practice, Figures 1 and 2 are views of a tire in transverse section, showing the binders arranged to engage with both edges of the tire or tire-cover. Fig. 3 is a similar view showing the binders riveted to one edge of the tire and engaging with the other edge. Figs. 4 and 5 are views in transverse section showing a tire with binders mounted on a wheel-rim. Fig. 6 is a view in transverse section showing the base of the tire or tire-cover provided with recesses for the binders to lie in. Fig. 7 is a view in transverse section showing another method of attaching the binder to one edge of the tire or tire-cover, and Fig. 8 is a view in plan of the binder employed. Fig. 9 is a view in transverse section of a tire and wheel-rim embodying my invention, showing how the spaces between the sides of the tire and the edges of the wheel-rim may be filled up. Fig. 10 is a broken sectional view showing how the binders may be conveniently mounted.

Throughout the views similar parts are marked with like letters of reference.

The binders A take the form of plates of metal or other suitable material having inturned edges forming hooks $a$, which engage with circumferential ears, lugs, or enlargements $b$ of the tire or tire-cover B. The binders may be of any desired width, and they may be made either plain, as shown by Fig. 1, or with a central ridge $a'$, as shown by Fig. 2.

When it is desired to make the binders fast to one edge of the tire or tire-cover, they may either be riveted thereto, as shown by Fig. 3, in which case the attached edge need not be made of a hook shape, or a tongue or fang, such as $a^2$, may be pressed out of the binder and closed against the inner margin of the edge of the tire or tire-cover, as shown by Figs. 7 and 8, to confine it in the hooked end of the binder. Tires or tire-covers fitted with these binders can be conveniently mounted on shallow concave rims, such as C, as shown by Figs. 4 and 5, or they can be mounted in wheel-rims, such as C, designed to receive other types of tires, as shown by Figs. 3, 6, 7, and 9. When the tires are intended to be fitted to wheel-rims adapted to carry other tires, both the binders A and the bases of the tires or tire-covers B are preferably shaped to fit the said rims, as shown by Figs. 3 and 6. Otherwise spaces may remain between the sides of the tire or tire-cover and the wheel-rim, as shown by Fig. 7, into which dirt and water may gather. To obviate this, when the base of the tire or tire-cover does not completely fill the wheel-rim I use bands, such as D, to fill the said spaces, as shown by Fig. 9, the said bands being made of rubber or other suitable material.

When the bases of the tires or tire-covers are shaped to adapt them to fit in and fill the wheel-rim, I prefer to form transverse grooves $b'$ in the divided base for the binders to lie in, as shown by Fig. 6.

When the binders are not intended to be fixed to the tire or tire-cover, they may be arranged in groups and be connected together by suitable means—such, for instance, as by a band, such as E, as shown by Fig. 10. This band may conveniently be made of an elastic material and may be attached to the binders, either on the outer side or inner side, by means of cement or in any other convenient manner. By mounting the binders on such a band they can be conveniently mounted in or on a wheel-rim, if desired. These binders may be used either with tires having separate air-tubes, as shown by Figs. 1, 4, and 7, or with tires having no independent air-tube, as shown by Figs. 2, 3, 5, 6, and 9.

By the use of my invention tires can be inflated apart from and independent of the wheel-rim, and such tires can conveniently be mounted in wheel-rims designed and shaped to receive other types of tires. When these binders are used with tires having independent air-tubes, their edges may be adapted to engage with holes or eyelets in the covers of the said tires instead of with ears or lugs thereon.

What I claim as my invention, and desire to secure by Letters Patent, is—

1. The combination, with a divided tire provided with a projection $b$ on one of its edges, of a series of binders each consisting of a narrow plate attached at one end to one edge of the tire and provided with a projection at its middle part between the edges of the tire and a hook at the other end for engaging with the projection on the other edge of the tire, substantially as set forth.

2. The combination, with a divided tire provided with projections $b$ at its edges, of binders for coupling the edges of the tire together, each said binder having a pointed projection $a'$ at its middle part projecting between the projections $b$, and hooks at its ends for engaging with the projections $b$, substantially as set forth.

JOHN TOWNSEND TRENCH.

Witnesses:
  D. DC MAC GILLYCUDDY,
  W. Y. LOVE.